United States Patent
Prevrhal et al.

(10) Patent No.: US 9,842,401 B2
(45) Date of Patent: Dec. 12, 2017

(54) SEGMENTATION APPARATUS FOR INTERACTIVELY SEGMENTING BLOOD VESSELS IN ANGIOGRAPHIC IMAGE DATA

(71) Applicant: KONINKLIJKE PHILIPS N.V., Eindhoven (NL)

(72) Inventors: Sven Prevrhal, Hamburg (DE); Hannes Nickisch, Hamburg (DE); Holger Schmitt, Luetjensee (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 25 days.

(21) Appl. No.: 14/912,101

(22) PCT Filed: Aug. 19, 2014

(86) PCT No.: PCT/EP2014/067660
§ 371 (c)(1),
(2) Date: Feb. 15, 2016

(87) PCT Pub. No.: WO2015/024934
PCT Pub. Date: Feb. 26, 2015

(65) Prior Publication Data
US 2016/0196660 A1   Jul. 7, 2016

(30) Foreign Application Priority Data
Aug. 21, 2013 (EP) .................................... 13181139

(51) Int. Cl.
*G06K 9/00* (2006.01)
*G06T 7/00* (2017.01)
(Continued)

(52) U.S. Cl.
CPC .............. *G06T 7/0081* (2013.01); *G06T 7/11* (2017.01); *G06T 2207/20104* (2013.01);
(Continued)

(58) Field of Classification Search
CPC ..................................... G06T 7/00; G06K 9/00
(Continued)

(56) References Cited

U.S. PATENT DOCUMENTS

| 8,157,742 B2 * | 4/2012 | Taylor | A61B 5/02007 |
| | | | 600/481 |
| 8,200,466 B2 * | 6/2012 | Spilker | G06F 19/3437 |
| | | | 703/11 |

(Continued)

FOREIGN PATENT DOCUMENTS

| DE | 102008014792 | 6/2009 |
| WO | 2004025572 | 3/2004 |

(Continued)

*Primary Examiner* — Abolfazl Tabatabai (57) ABSTRACT

The present invention relates a segmentation apparatus (10) for interactively segmenting blood vessels (2) in angiographic image data (3). The segmentation apparatus (10) comprises a significant location determining unit (11) for determining one or more locations of a current segmentation (4) of the blood vessels (2) in the angiographic image data (3) as significant locations (5) at which the current segmentation (4) has a predetermined influence on a value of a blood flow parameter that is calculated based on the current segmentation (4), and a display unit (12) for displaying the significant locations (5) to an operator. Thereby, the operator can be guided to focus his/her segmentation efforts to those locations of the current segmentation (4) that are most relevant for the accuracy of the calculation of the value of the blood flow parameter. This may ease the burden on the operator during the segmentation procedure.

20 Claims, 4 Drawing Sheets

(51) Int. Cl.
*G06T 7/11* (2017.01)
*A61B 5/02* (2006.01)

(52) U.S. Cl.
CPC ............... *G06T 2207/30048* (2013.01); *G06T 2207/30104* (2013.01); *G06T 2210/41* (2013.01)

(58) Field of Classification Search
USPC ....... 382/128, 129, 130, 131, 132, 133, 134, 382/164; 600/407, 410, 411, 479, 481, 600/485, 504; 345/419, 424, 33, 34, 38
See application file for complete search history.

(56) References Cited

U.S. PATENT DOCUMENTS

| | | | |
|---|---|---|---|
| 8,249,815 | B2 | 8/2012 | Taylor |
| 8,270,696 | B2 | 9/2012 | Udupa et al. |
| 8,290,247 | B2 | 10/2012 | Slabaugh et al. |
| 8,391,603 | B2 | 3/2013 | Tizhoosh et al. |
| 2005/0110791 | A1 | 5/2005 | Krishnamoorthy et al. |
| 2009/0097749 | A1 | 4/2009 | Busch et al. |
| 2010/0104168 | A1 | 4/2010 | Dobbe |
| 2010/0130878 | A1 | 5/2010 | Lasso |
| 2010/0241404 | A1 | 9/2010 | Taylor |
| 2011/0071404 | A1 | 3/2011 | Schmitt et al. |
| 2011/0307231 | A1 | 12/2011 | Kirchner |
| 2012/0014574 | A1 | 1/2012 | Ferschel et al. |
| 2012/0022843 | A1 | 1/2012 | Ionasec |
| 2012/0041318 | A1 | 2/2012 | Taylor |
| 2012/0041319 | A1 | 2/2012 | Taylor |
| 2012/0041320 | A1 | 2/2012 | Taylor |
| 2012/0041321 | A1 | 2/2012 | Taylor |
| 2012/0041322 | A1 | 2/2012 | Taylor |
| 2012/0041323 | A1 | 2/2012 | Taylor |
| 2012/0041735 | A1 | 2/2012 | Taylor |
| 2012/0041739 | A1 | 2/2012 | Taylor |
| 2012/0053919 | A1 | 3/2012 | Taylor |
| 2012/0059246 | A1 | 3/2012 | Taylor |
| 2012/0072190 | A1 | 3/2012 | Sharma |
| 2012/0121151 | A1 | 5/2012 | Bernhardt |
| 2012/0243761 | A1 | 9/2012 | Senzig |
| 2014/0086461 | A1* | 3/2014 | Yao ........................ A61B 6/032 382/128 |

FOREIGN PATENT DOCUMENTS

| | | |
|---|---|---|
| WO | 200661814 | 6/2006 |
| WO | 200661815 | 6/2006 |
| WO | 201022762 | 3/2010 |

* cited by examiner

SEGMENTATION APPARATUS FOR INTERACTIVELY SEGMENTING BLOOD VESSELS IN ANGIOGRAPHIC IMAGE DATA

CROSS REFERENCE TO RELATED APPLICATIONS

This application is the U.S. National Phase application under 35 U.S.C. §371 of International Application No. PCT/EP2014/067660, filed Aug. 19, 2014, published as WO 2015/024934 on Feb. 26, 2015, which claims the benefit of European Patent Application Number 13181139.0 filed Aug. 21, 2013. These applications are hereby incorporated by reference herein.

FIELD OF THE INVENTION

The present invention relates to a segmentation apparatus, a segmentation method, and a segmentation computer program for interactively segmenting blood vessels in angiographic image data. The present invention relates further to a system for calculating values of a blood flow parameter based on a segmentation of blood vessels in angiographic image data, wherein the system comprises the segmentation apparatus.

BACKGROUND OF THE INVENTION

US 2011/0071404 A1 discloses a computer-based system for evaluating a region of a lumen. The system comprises an image acquisition device for collecting a set of data regarding a lumen of a length L, wherein the set comprises a plurality of cross-sectional areas at a plurality of positions along the length L. The system further comprises a memory for storing the set of cross-sectional areas at the plurality of positions along the length L and a processor in communication with the memory, wherein the processor is configured to determine a vascular resistance ratio for the length L of the lumen in response to at least a portion of the set of data in the memory and to determine a characteristic of at least a portion of the region disposed along the length L in response to the vascular resistance ratio.

Fractional flow reserve (FFR) is a technique that involves determining the ratio between the maximum achievable blood flow in a diseased coronary artery and the theoretical maximum flow in a normal coronary artery. Currently, FFR is measured invasively during a conventional coronary angiography procedure by placing a pressure measuring wire directly in the patient's coronary arterial tree. In contrast, several newer studies have shown that a non-invasive measurement of FFR also referred to as virtual FFR or simply vFFR is possible using angiographic image data (see, e.g., Koo B K et al., "Diagnosis of ischemia-causing coronary stenoses by noninvasive fractional flow reserve computed from coronary computed tomographic angiograms. Results from the prospective multicenter DISCOVER-FLOW (Diagnosis of Ischemia-Causing Stenoses Obtained Via Noninvasive Fractional Flow Reserve) study", in Journal of the American College of Cardiology, Vol. 58, No. 19, November 2011, pages 1989-1997).

The measurement of vFFR is based on the calculation of blood flow parameters, in particular, pressures resp. ratios thereof, along the segmented coronary arterial tree and, as such, depends very strongly on the accurate detection and segmentation of the coronary arteries. The problem is that such segmentation can be a very time-consuming procedure, which typically involves semi-automatic image processing algorithms that require interactive control by an operator, e.g., a physician, in order to segment each branch of the coronary arterial tree. In particular, the very thin apical arterial locations are hard to accurately segment; yet, they may be of high importance for the vFFR accuracy. In addition, operators often only rely on their visual assessment for deciding when the segmentation is "good enough". This may lead to the missing of intermediate-grade, but clinically relevant stenoses (i.e., abnormal narrowings or constrictions of the diameter of a blood vessel) in the coronary arteries.

SUMMARY OF THE INVENTION

It is an object of the present invention to provide a segmentation apparatus, a segmentation method, and a segmentation computer program for interactively segmenting blood vessels in angiographic image data, which allow to ease the burden on an operator during the segmentation procedure. It is a further object of the present invention to provide a system for calculating values of a blood flow parameter based on a segmentation of blood vessels in angiographic image data, wherein the system comprises the segmentation apparatus.

In a first aspect of the present invention a segmentation apparatus for interactively segmenting blood vessels in angiographic image data is presented, wherein the segmentation apparatus comprises:

a significant location determining unit for determining one or more locations of a current segmentation of the blood vessels in the angiographic image data as significant locations at which the current segmentation has a predetermined influence on a value of a blood flow parameter that is calculated based on the current segmentation, and a display unit for displaying the significant locations to an operator.

Since the significant location determining unit is adapted to determine one or more locations of a current segmentation of the blood vessels in the angiographic image data as significant locations, i.e., as locations at which the current segmentation has a predetermined influence on a value of a blood flow parameter that is calculated based on the current segmentation, and since the display unit is adapted to display the significant locations to an operator, the operator can be guided to focus his/her segmentation efforts to those locations of the current segmentation that are most relevant for the accuracy of the calculation of the value of the blood flow parameter. This allows to ease the burden on the operator during the segmentation procedure, since he/she may now only need to perform the segmentation with a higher degree of accuracy and, thus, a higher effort at the significant locations. In effect, this may result in a higher-quality segmentation of the blood vessels in the angiographc image data and, therewith, a higher-accuracy calculation of values of the blood flow parameter based on the segmentation.

The angiographic image data are preferentially 3D image data that have been acquired during a prior angiography procedure using, e.g., CT (computed tomography) angiography and/or MR (magnetic resonance) angiography.

The current segmentation of the blood vessels in the angiographic image data can be the result of one or more semi-automatic image processing algorithms that are interactively controlled by the operator (see, e.g., Benmansour F and Cohen L D, "Tubular Structure Segmentation Based on Minimal Path Method and Anisotropic Enhancement", in International Journal of Computer Vision, Vol. 92, No. 2, April 2011, pages 192-210). The segmentation apparatus preferentially comprises a current segmentation providing unit for providing the current segmentation of the blood vessels in the angiographic image data. The current segmentation providing unit can comprise a storage unit, such as a hard drive, an optical disk, a solid-state memory (e.g., a USB stick), or the like, on which an already existing current segmentation of the blood vessels in the angiographic image data can be stored. The storage unit can be directly connectable to the segmentation apparatus and/or it can be connectable to the segmentation apparatus via a wired or wireless network. Additionally or alternatively, the current segmentation providing unit can be adapted for executing the one or more semi-automatic image processing algorithms for segmenting the blood vessels in the angiographic image data under the interactive control of the operator. It can also be possible that the current segmentation of the blood vessels in the angiographic image data is automatically generated using, e.g., one or more fully-automatic image processing algorithms without any interactive control by the operator (see, e.g., Wang Y and Liatsis P, "3-D Quantitative Vascular Shape Analysis for Arterial Bifurcations via Dynamic Tube Fitting", in IEEE Trans Biomed Eng., Vol. 59, No. 7, July 2012, pages 1850-1860).

In an embodiment, the blood vessels include coronary arteries of a human being and the blood flow parameter is a virtual fractional flow reserve (vFFR).

The operator is preferentially a physician or the like.

It is preferred that the significant location determining unit comprises a significant location candidate determining unit for determining one or more locations of the current segmentation as significant location candidates based on a criterion that depends on the current segmentation at the one or more locations, and a blood flow parameter calculating unit for calculating, for a simulated variation of the diameter of the current segmentation at one of the significant location candidates, the value of the blood flow parameter at one or more of the significant location candidates, wherein the significant location determining unit is adapted to determine the one of the significant location candidates as a significant location if the simulated variation of the diameter of the current segmentation results in a predetermined variation in the value of the blood flow parameter at one or more of the significant location candidates. The heuristic behind this approach is that if it is determined that the value of the blood flow parameter varies in a predetermined manner at one or more of the significant location candidates when a variation of the diameter of the current segmentation at one of the significant location candidates is simulated, the one of the significant location candidates should be regarded as being a significant location and the operator should make sure that it is segmented with a higher degree of accuracy.

In an embodiment, the criterion is based on a rate of change of the diameter of the current segmentation at the one or more locations. For instance, a location of the current segmentation can be determined as a significant location candidate if the rate of change which may, e.g., be calculated as a simple derivative in case the segmentation is represented by one or more mathematical functions, such as spline curves or straight segments interpolating a number of nodes of the segmentation of the diameter of the current segmentation at that location is large. This can be determined, e.g., by comparing the rate of change with a predefined threshold. Since the rate of change of the diameter of the current segmentation can be calculated in a simple manner, and since e.g. stenoses, which in general have a significant influence on the blood flow in the blood vessels, are typically characterized by rapid changes in blood vessel diameter, the rate of change of the diameter of the current segmentation can be a good criterion for determining the significant location candidates.

In another embodiment, the criterion is based on the value of the blood flow parameter calculated at the one or more locations. For instance, if the blood flow parameter is a virtual fractional flow reserve (vFFR), a location of the current segmentation can be determined as a significant location candidate if the value of the vFFR calculated at that location is within a predefined range, e.g., in the range from 0.65 to 0.85. The idea behind this is that vFFR values of <0.75 are in general considered to define a hemodynamically significant stenosis, whereas vFFR values of >0.75 are in general considered to be uncritical. Thus, if the value of the blood flow parameter at a location of the current segmentation is within the range of e.g. 0.65 to 0.85 (i.e., 0.75±0.1), the likelihood that modifications of the current segmentation at that location may alter the vFFR value from an uncritical value to a value defining a hemodynamically significant stenosis, and vice versa, is rather high. Since subsequent treatment decisions will typically depend on whether a stenosis is categorized by the operator, e.g., a physician, as being significant or uncritical, it is important for the operator to particularly consider those locations that could eventually be categorized differently depending on the accuracy of the segmentation.

It is further preferred that the significant location determining unit is adapted to determine the one of the significant location candidates as a significant location if the value of the blood flow parameter at one or more of the significant location candidates transitions across a predefined threshold as a result of the simulated variation of the diameter of the current segmentation. For instance, if the blood flow parameter is a virtual fractional flow reserve (vFFR), the predefined threshold is preferably 0.75, i.e., the vFFR value that in general is considered to be the threshold for distinguishing between a hemodynamically significant stenosis and an uncritical medical finding (see above).

It is preferred that the display unit is adapted to display the current segmentation with the angiographic image data to the operator, wherein the significant locations are indicated by means of visual indications. This provides an easy and efficient way of guiding the operator to focus his/her segmentation efforts to the significant locations. The visual indications can comprise, e.g., signs or other visual marks, such as boxes, crosses, triangles, circles, pointers, stippled lines, or the like, that indicate the significant locations of the current segmentation. Additionally or alternatively, color codings, specific shadings, or the like, can be used as visual indications.

It is further preferred that the significant location determining unit comprises a blood flow parameter calculating unit for calculating the value of the blood flow parameter at the significant locations, wherein the display unit is adapted for displaying the value of the blood flow parameter at the significant locations to the operator. In the typical case, the value of the blood flow parameter can be displayed as a number. For instance, if the blood flow parameter is a virtual fractional flow reserve (vFFR), the value of the vFFR can be displayed as a number between 0 and 1.

Moreover, it is preferred that the blood flow parameter calculating unit is adapted for calculating a certainty of the value of the blood flow parameter at the significant locations, wherein the display unit is adapted for displaying the certainty of the value of the blood flow parameter at the significant locations to the operator. This additional information can be of importance for the operator, e.g., a physician, for deciding whether or not one or more further medical exams are required and/or for making subsequent treatment decisions. The certainty of the value of the blood flow parameter at the significant locations can be displayed, e.g., as an error bar or as a range bracket.

In an embodiment, the blood flow parameter calculating unit is adapted for calculating the certainty of the value of the blood flow parameter at the significant locations by simulating a variation of the diameter of the current segmentation at the significant locations according to an expected segmentation error. The expected segmentation error can be a value that has been determined experimentally, e.g., by means of segmentation experiments performed with a group of trained operators using ground-truth angiographic image data. To give an example, if it has been experimentally determined that an average trained operator typically segments the blood vessels at a location corresponding to a significant location such that the resulting diameter at that location is between +2 and −2 picture elements wrong, i.e., different from the ground-truth, the certainty can be calculated by simulating a +2 picture elements wider and a −2 picture elements narrower diameter of the current segmentation at the significant location and by calculating the value of the blood flow parameter at the significant location based on this simulated variation. In another example, it may also be possible to determine, e.g., by means of segmentation experiments, an average diameter variation of the segmentations performed by trained operators as a function of an average diameter value and to use such average diameter variation here for the certainty calculation. The determination of the average diameter variation may be based on Bland-Altman plots.

It is further preferred that the significant location determining unit is adapted to determine, for a structure of the blood vessels that is only incompletely segmented in the current segmentation, whether a simulated variation of the diameter of an estimated segmentation of the incompletely segmented structure results in the predetermined variation in the value of the blood flow parameter at one or more of the significant location candidates, wherein the display unit is adapted for displaying a result of the determination to the operator by means of a visual indication. This can be used, for example, when the very thin apical arterial locations have not been completely segmented in the current segmentation, e.g., because the one or more semi-automatic image processing algorithms were not able to work sufficienty with such fine structures. In this case, e.g., a segmentation of these structures may be estimated from neighboring structures and a variation of the diameter of the estimated segmentation may be simulated. If such simulation does not result in the predetermined variation in the value of the blood flow parameter at one or more of the significant location candidates, a further segmentation of these structures may not be necessary. This may be displayed to the operator by means of a suitable visual indication.

It is preferred that the segmentation apparatus comprises a segmentation modifying unit for allowing the operator to modify the current segmentation at least at the significant locations. This allows the operator to update and improve the current segmentation at those locations that are most relevant for the accuracy of the calculation of the value of blood flow parameter. The modification can be, e.g., fully manual or semi-automatic. For example, the operator can be able to add or remove one or more nodes for refining the current segmentation at the significant locations. Of course, the segmentation modifying unit can also be adapted for allowing the operator to modify the current segmentation at locations other than the significant locations.

In another aspect of the present invention a segmentation method for interactively segmenting blood vessels in angiographic image data is presented, wherein the segmentation method comprises:

determining one or more locations of a current segmentation of the blood vessels in the angiographic image data as significant locations at which the current segmentation has a predetermined influence on a value of a blood flow parameter that is calculated based on the current segmentation, by means of a significant location determining unit, and displaying the significant locations to an operator, by means of a display unit.

In another aspect of the present invention a segmentation computer program for interactively segmenting blood vessels in angiographic image data is presented, wherein the segmentation computer program comprises program code means for causing the segmentation apparatus defined in claim 1 to carry out the steps of the segmentation method defined in claim 14, when the segmentation computer program is run on a computer controlling the segmentation apparatus.

In another aspect of the present invention, a system for calculating values of a blood flow parameter based on a segmentation of blood vessels in angiographic image data is presented, wherein the system comprises:

a segmentation apparatus for interactively segmenting the blood vessels in the angiographic image data as defined in claim 1, and a blood flow parameter calculating unit for calculating the values of the blood flow parameter.

It shall be understood that the segmentation apparatus of claim 1, the segmentation method of claim 14, and the segmentation computer program of claim 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
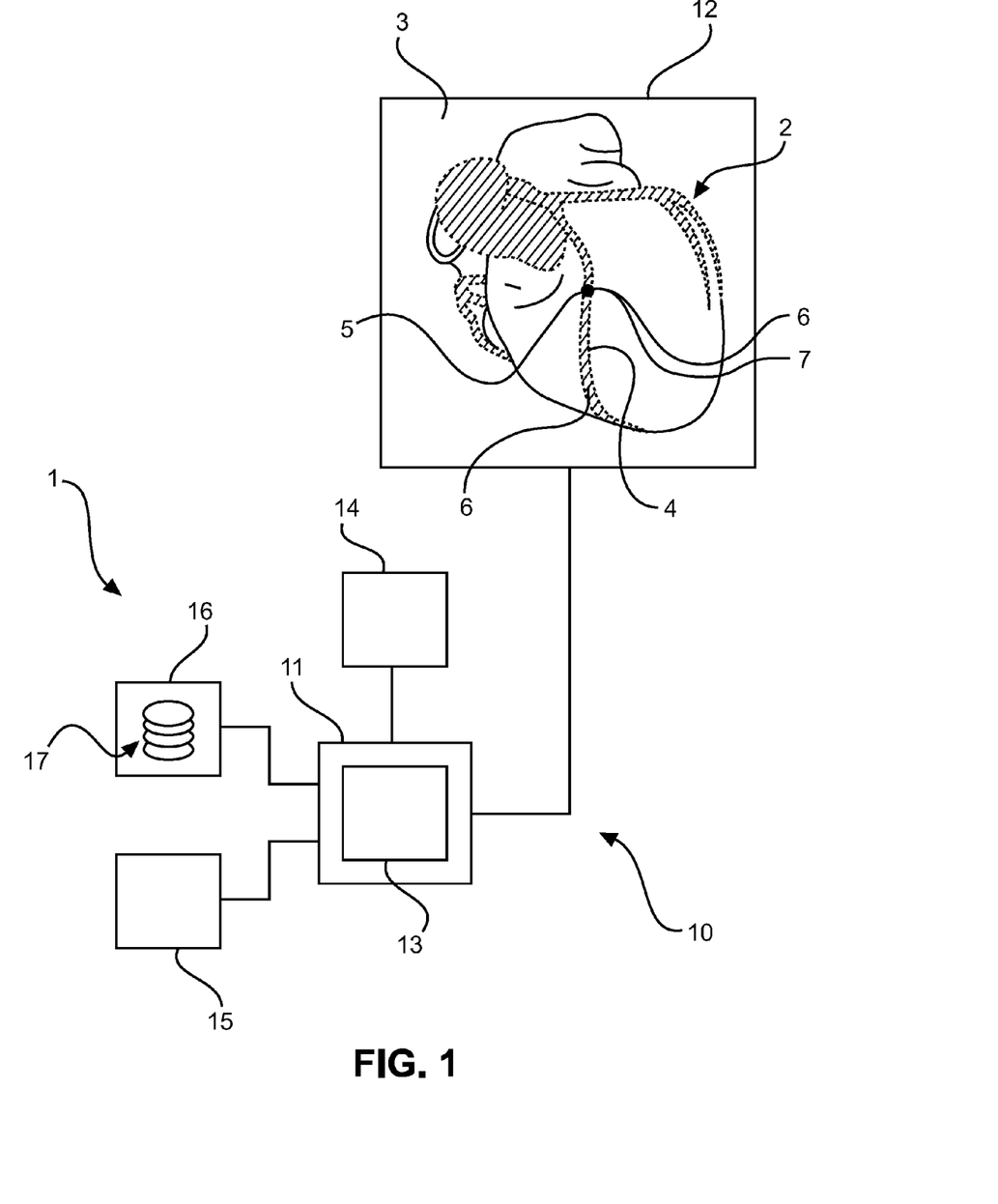
FIG. 1 shows schematically and exemplarily an embodiment of a system for calculating values of a blood flow parameter based on a segmentation of blood vessels in angiographic image data, wherein the system comprises a segmentation apparatus for interactively segmenting the blood vessels in the angiographic image data.

FIG. 1 shows schematically and exemplarily an embodiment of a system 1 for calculating values of a blood flow parameter, here, a virtual fractional flow reserve (vFFR), based on a segmentation 4 of blood vessels 2, in this example, coronary arteries of a human being (not shown in the figure), in angiographic image data 3. The system 1 comprises a segmentation apparatus 10 for interactively segmenting the coronary arteries 2 in the angiographic image data 3, and a blood flow parameter calculation unit 14 for calculating the values of the vFFR.

The segmentation apparatus 10 comprises a significant location determining unit 11 for determining one or more locations of a current segmentation 4 of the coronary arteries 2 in the angiographic image data 3 as significant locations 5, i.e., as locations at which the current segmentation 4 has a predetermined influence on a value of the vFFR that is calculated based on the current segmentation 4, and a display unit 12 for displaying the significant locations 5 to an operator, e.g., a physician (not shown in the figure). This allows the operator to be guided to focus his/her segmentation efforts to those locations of the current segmentation 4 that are most relevant for the accuracy of the calculation of the values of the vFFR and, therewith, to ease the burden on the operator during the segmentation procedure.

Here, the current segmentation 4 of the coronary arteries 2 in the angiographic image data 3 is the result of one or more semi-automatic image processing algorithms that are interactively controlled by the operator. The segmentation apparatus 10 comprises a current segmentation providing unit 16 for providing the current segmentation 4 of the coronary arteries 2 in the angiographic image data 3. The current segmentation providing unit 16 includes a storage unit 17, here, a hard drive, on which an already existing current segmentation 4 of the coronary arteries 2 in the angiographic image data 3 is stored. In this example, the current segmentation providing unit 16 is additionally adapted for executing the one or more semi-automatic image processing algorithms for segmenting the coronary arteries 2 in the angiographic image data 3 under the interactive control of the operator. In another embodiment, it can also be possible that the current segmentation 4 of the coronary arteries 2 in the angiographic image data 3 is automatically generated using, e.g., one or more fully-automatic image processing algorithms without any interactive control by the operator.

In this embodiment, the significant location determining unit 11 comprises a significant location candidate determining unit 13 for determining one or more locations of the current segmentation 4 as significant location candidates 6 based on a criterion that depends on the current segmentation 4 at the one or more locations.

Here, the criterion is based on the value of the vFFR at the one or more locations. In particular, a location of the current segmentation 4 is determined as a significant location candidate 6 if the value of the vFFR calculated at that location is within a predefined range, here, in the range from 0.65 to 0.85.

The significant location determining unit 11, in this embodiment, further comprises a blood flow parameter calculating unit 14 for calculating, for a simulated variation of the diameter of the current segmentation 4 at one of the significant location candidates 6, the value of the blood flow parameter, here, the vFFR, at one or more of the significant location candidates 6, wherein the significant location determining unit 11 is adapted to determine the one of the significant location candidates 6 as a significant location 5 if the simulated variation of the diameter of the current segmentation 4 results in a predetermined variation in the value of the vFFR at one or more of the significant location candidates 6. The heuristic behind this approach is that if it is determined that the value of the vFFR varies in a predetermined manner (see below) at one or more of the significant location candidates 6 when a variation of the diameter of the current segmentation 4 at one of the significant location candidates 6 is simulated, the one of the significant location candidates 6 should be regarded as being a significant location 5 and the operator should make sure that it is segmented with a higher degree of accuracy.

In this embodiment, the blood flow parameter calculating unit 14 of the significant location determining unit 11 corresponds to the blood flow parameter calculating unit 14 of the system 1, which is here suitably adapted to also perform the above diameter variation simulation.

The significant location determining unit 11, in this embodiment, is particularly adapted to determine the one of the significant location candidates 6 as a significant location 5 if the value of the vFFR at one or more of the significant location candidates 6 transitions across a predefined threshold, here, 0.75, as a result of the simulated variation of the diameter of the current segmentation 4.

The display unit 12, here, is adapted to display the current segmentation 4 with the angiographic image data 3 to the operator, wherein the significant locations 5 are indicated by means of visual indications 7 (here a filled black dot). One possible approach for doing so is described in more detail with reference to FIG. 2, which shows schematically and exemplarily a way of displaying significant locations 5 of a current segmentation 4 of blood vessels 2, here, coronary arteries of a human being (not shown in the figure), in angiographic image data 3 to an operator, e.g., a physician.

As can be seen from the figure, the significant location determining unit 11 has determined, in this example, two locations of the current segmentation 4 as significant locations 5. These are indicated to the operator by means of visual indications 7, here, the filled black circles on the left side of the figure indicating the first significant location and the unfilled black circles a bit more to the right of the figure indicating the second significant location 5. The location of the current segmentation 4 indicated in FIG. 2 by means of the filled black triangles has not been determined by the significant location determining unit 11 as a significant location 5 in the above described sense; however, since the vFFR value of 0.56 at that location clearly defines a hemodynamically significant stenosis, it is also visually indicated in this embodiment to the operator albeit with a different visual indication to distinguish it from the significant locations 5.

With returning reference to FIG. 1, the blood flow parameter calculating unit 14 is adapted for calculating the value of the vFFR at the significant locations 5, wherein the display unit 12 is adapted for displaying the value of the vFFR at the significant locations 5 to the operator. In this embodiment, the value of the vFFR is displayed as a number between 0 and 1. For example, the value of the vFFR at the first significant location 5 is 0.72; this value is displayed in FIG. 2 within a rectangle with an attached arrow that points to the significant location 5. The value of the vFFR at the second significant location 5 is 0.78. This value is displayed in FIG. 2 in the same manner within a rectangle with an attached arrow.

In this embodiment, the blood flow parameter calculating unit 14 is adapted for calculating a certainty of the value of the vFFR at the significant locations 5, wherein the display unit 12 is adapted for displaying the certainty of the value of the vFFR at the significant locations 5 to the operator. This additional information can be of importance for the operator, e.g., a physician, for deciding whether or not one or more further medical exams are required and/or for making treatment decisions. The certainty of the value of the vFFR at the significant locations 5 is displayed in FIG. 2 as a range bracket within the rectangles described above.

Figure 2:
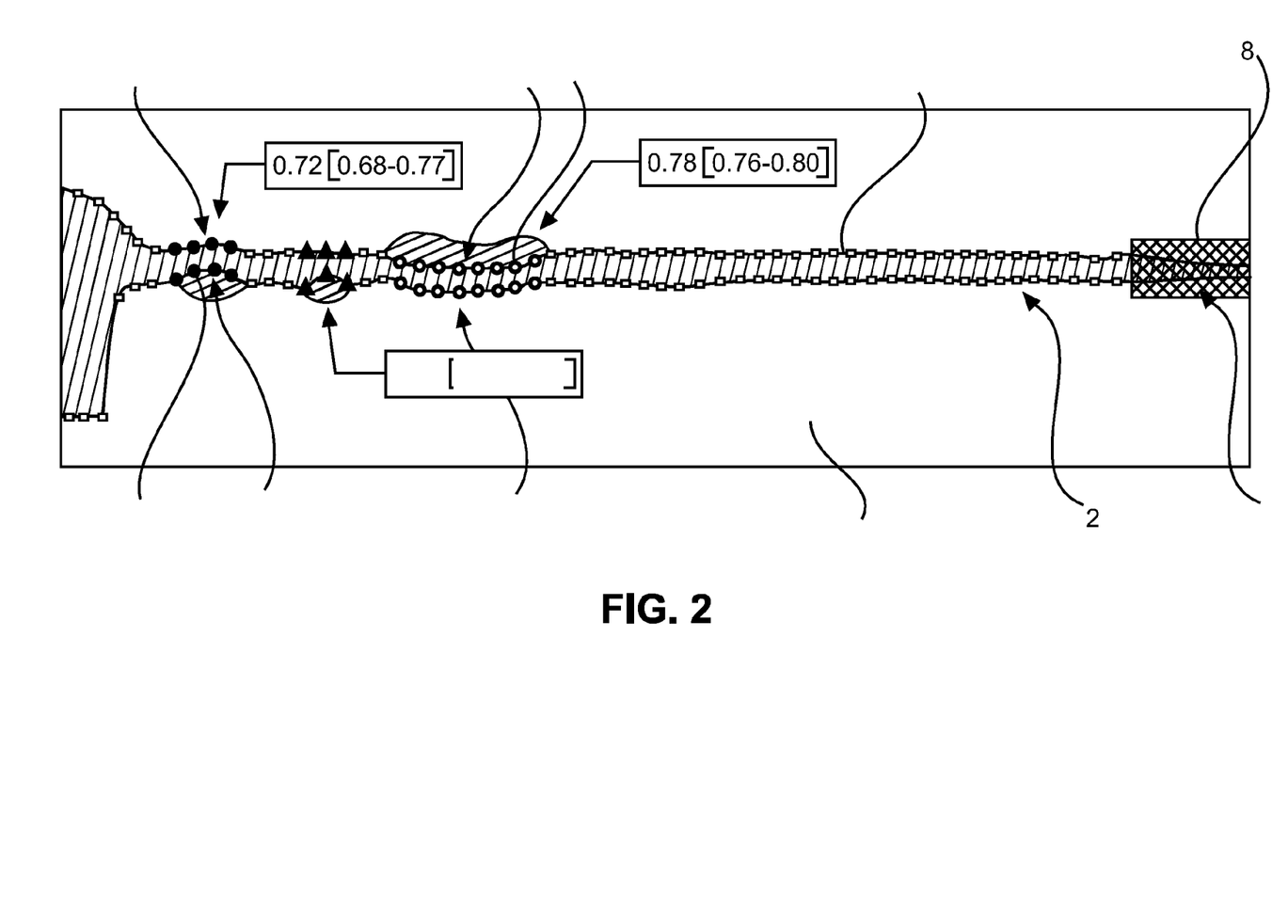
FIG. 2 shows schematically and exemplarily a way of displaying significant locations of a current segmentation of blood vessels in angiographic image data to an operator.

The blood flow parameter calculating unit 14 is adapted, here, for calculating the certainty of the value of the vFFR at the significant locations 5 by simulating a variation of the diameter of the current segmentation 4 at the significant locations 5 according to an expected segmentation error. This expected segmentation error may be an experimentally determined average diameter variation of the segmentations performed by trained operators as a function of an average diameter value.

Here, the simulated variation of the diameter of the current segmentation 4 at the significant locations 5 according to the expected segmentation error performed for calculating the certainty of the value of the vFFR at the significant locations 5 is the same as the simulated variation of the diameter of the current segmentation 4 performed for determining whether a significant location candidate 6 is indeed a significant location (see above). In other words, the significant location determining unit 11 determines a significant location candidate 6 as a significant location 5 if the value of the vFFR at one or more of the significant location candidates 6 transitions across a predefined threshold, here, 0.75, as a result of the simulated variation of the diameter of the current segmentation 4 at the significant location candidate 6 according to the expected segmentation error.

In FIG. 2, the two significant locations 5 determined by the significant location determining unit 11 are indicated by different visual indications 7 (here, filled black circles for indicating the first significant location 5 and unfilled black circles for indicating the second significant location 5). The reason here is that, in this example, the significant location determining unit 11 has determined that for the first significant location 5 the value of the vFFR at that location (i.e., the corresponding significant location candidate 6) transitions across the 0.75 value as a result of the simulated variation of the diameter of the current segmentation 4 at that location (since the vFFR value is only certain to be between 0.68 and 0.77 for the expected segmentation error). On the other hand, as can be seen from the displayed certainty of the value of the vFFR at the second significant location 5, the simulated variation of the diameter of the current segmentation 4 at that location (i.e., the corresponding significant location candidate 6) according to the expected segmentation error does not result in the value of the vFFR transitioning across the 0.75 value at that location (the vFFR value being certain to be between 0.76 and 0.80). However, the current segmentation 4 at the second significant location 5 has been found, in this example, to have the predetermined influence on the value of the vFFR calculated at the significant location candidate 6 corresponding to the first significant location 5. These different constellations are indicated to the operator by means of the described different visual indications 7.

The significant location determining unit 11 is adapted, in this embodiment, to determine, for a structure 9 of the coronary arteries 2 that is only incompletely segmented in the current segmentation 4, whether a simulated variation of the diameter of an estimated segmentation of the incompletely segmented structure 9 results in the predetermined variation in the value of the vFFR at one or more of the significant location candidates 6, wherein the display unit 12 is adapted for displaying a result of the determination to the operator by means of a visual indication 8. This is explained with reference to FIG. 2 for the very thin apical arterial structure 9 that has not been completely segmented in the current segmentation 4, e.g., because the one or more semi-automatic image processing algorithms were not able to work sufficienty with such fine structures. In this embodiment, a segmentation (not shown in the figure) of this structure 9 is estimated from the neighboring structure of the coronary arteries 2 and a variation of the diameter of the estimated segmentation is simulated. If such simulation does not result in the predetermined variation in the value of the vFFR at one or more of the significant location candidates 6, a further segmentation of this structure 9 is not necessary. This is displayed here to the operator by means of a suitable visual indication 8.

With returning reference to FIG. 1, the segmentation apparatus 10, in this embodiment, comprises a segmentation modifying unit 15 for allowing the operator to modify the current segmentation 4 at least at the significant locations 5. This allows the operator to update and improve the current segmentation 4 at those locations that are most relevant for the accuracy of the calculation of the value of the vFFR. In this example, the operator is able to add or remove one or more nodes for refining the current segmentation 4 at the significant locations 5.

Figure 3:
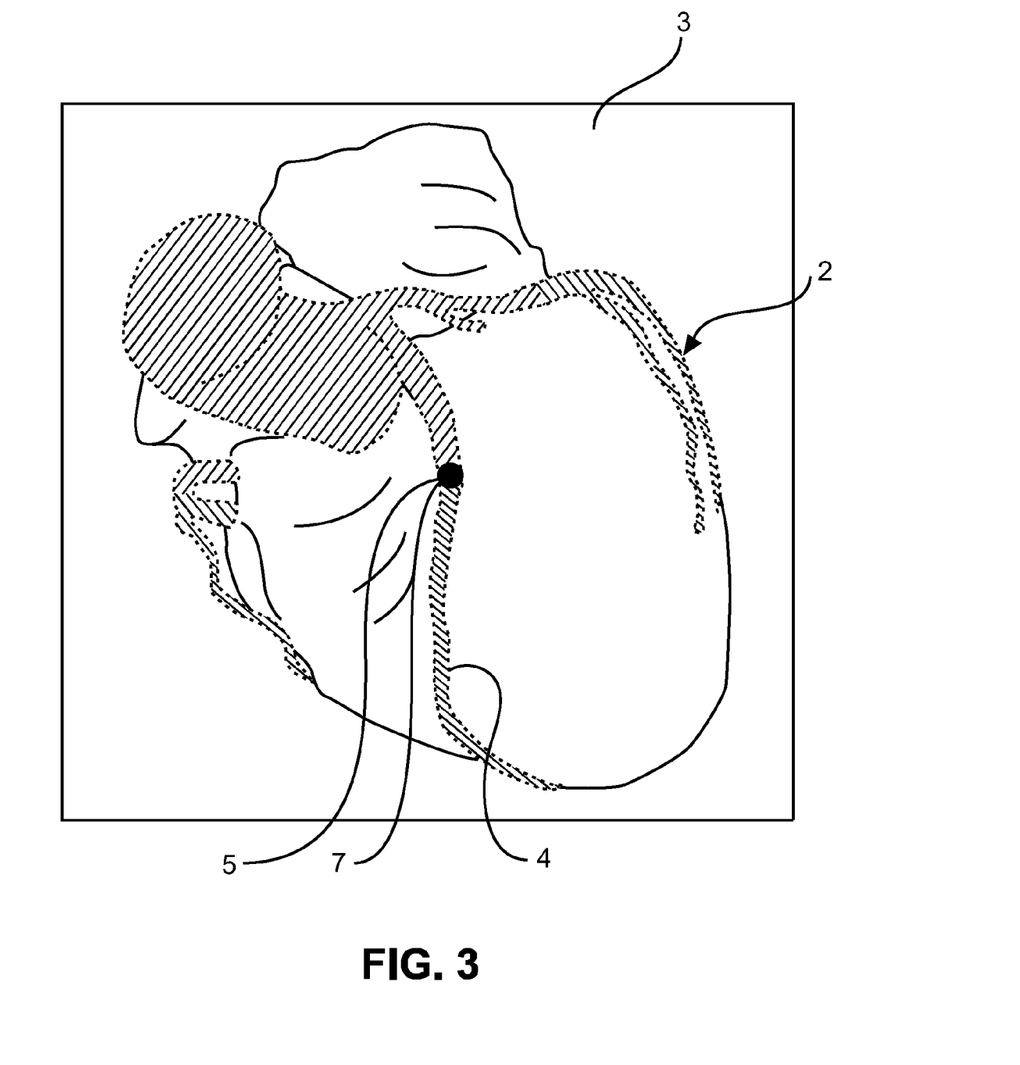
FIG. 3 shows schematically and exemplarily another way of displaying significant locations of a current segmentation of blood vessels in angiographic image data to an operator.

FIG. 3 shows schematically and exemplarily another way of displaying significant locations 5 of a current segmentation 4 of blood vessels 2, here coronary arteries of a human being (not shown in the figure), in angiographic image data 3 to an operator, e.g., a physician. From this figure, it can be seen that, in this example, the significant location determining unit 11 has determined that the accuracy of the calculation of the vFFR from the current segmentation 4 significantly depends on the accuracy of the current segmentation 4 at the significant location 5 determined at the proximal LAD. Here, the angiographic image data 3 is displayed to the operator in a 3D representation with the current segmentation 4, wherein the significant location 5 is indicated to the operator by means of a filled black circle (see above). In this example, the value of the vFFR at the significant location 5 and its certainty are not displayed to the operator by the display unit 12. In other examples, however, these values can be displayed in a similar manner as described with reference to FIG. 2 above.

Figure 4:
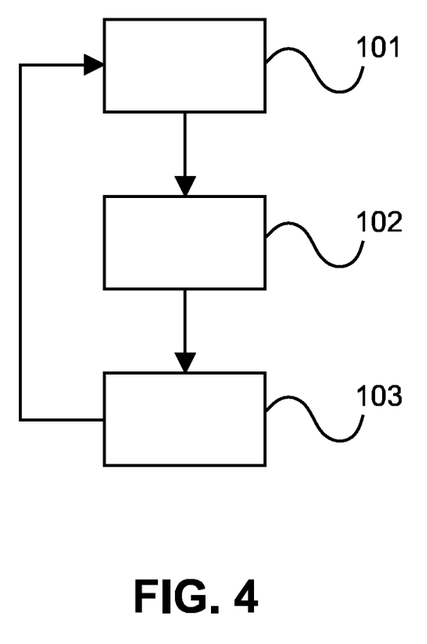
FIG. 4 shows a flowchart exemplarily illustrating an embodiment of a segmentation method for interactively segmenting blood vessels in angiographic image data to be used with the system shown in FIG. 1.

FIG. 4 shows a flowchart exemplarily illustrating an embodiment of a segmentation method for interactively segmenting blood vessels 2 in angiographic image data 3 to be used with the system shown in FIG. 1.

In step 101, one or more locations of a current segmentation 4 of the blood vessels 2, in this example, coronary arteries of a human being, in the angiographic image data 3 are determined as significant locations 5 at which the current segmentation 4 has a predetermined influence on a value of a blood flow parameter, here, a virtual fractional flow reserve (vFFR), that is calculated based on the current segmentation 4, by means of a significant location determining unit 11. In step 102, the significant locations 5 are displayed to an operator, by means of a display unit 12. This allows the operator to be guided to focus his/her segmentation efforts to those locations of the current segmentation 4 that are most relevant for the accuracy of the calculation of the value of the FFR and, therewith, to ease the burden on the operator during the segmentation procedure. In this embodiment, in step 103, the operator is allowed to modify the current segmentation 4 at least at the significant locations 5, by means of a segmentation modifying unit 15. Steps 101 to 103 can be performed repeatedly in order to gradually improve the current segmentation 4 of the coronary arteries 2 in the angiographic image data 3.

Further details and/or configurations of the above segmentation method can be understood from the corresponding explanations of the segmentation apparatus 10 described in detail with reference to FIGS. 1 to 3 above.

Although in the embodiment described in detail with reference to FIGS. 1 to 3, the blood vessels are coronary arteries of a human being and the blood flow parameter is a virtual fractional flow reserve (vFFR), the present invention can also be applied to the interactive segmentation of other suitable anatomy of a human or other living being in angiographic image data. For instance, the blood vessels that are interactively segmented can include the brain circulatory system or parts thereof or the major vessels of the trunk or parts thereof of a human or other living being. The blood flow parameter can be or include a vFFR or a comparable vFFR-like measure calculated based on the segmentation of the selected anatomy or it can be or include another blood flow parameter that is based on, e.g., the calculation of pressures and/or ratios thereof.

Although in the embodiment described in detail with reference to FIG. 1, the criterion is based on the value of the vFFR at the one or more locations, in other embodiments, the criterion can also be based on something else, e.g., a rate of change of the diameter of the current segmentation at the one or more locations. For instance, a location of the current segmentation can be determined as a significant location candidate if the rate of change of the diameter of the current segmentation at that location is large. This can be determined, e.g., by comparing the rate of change with a predefined threshold. In addition, it can also be possible that the criterion is based on both the value of the vFFR and the rate of change of the current segmentation at the one or more locations.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the determination of the one or more locations of the current segmentation as significant locations, the determination of the one or more significant location candidates, the display of the significant locations to the operator, et cetera performed by one or several units or devices can also be performed by any other number of units or devices. These procedures and/or the control of the segmentation apparatus in accordance with the segmentation method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The present invention relates a segmentation apparatus for interactively segmenting blood vessels in angiographic image data. The segmentation apparatus comprises a significant location determining unit for determining one or more locations of a current segmentation of the blood vessels in the angiographic image data as significant locations at which the current segmentation has a predetermined influence on a value of a blood flow parameter that is calculated based on the current segmentation, and a display unit for displaying the significant locations to an operator. Thereby, the operator can be guided to focus his/her segmentation efforts to those locations of the current segmentation that are most relevant for the accuracy of the calculation of the value of the blood flow parameter. This allows to ease the burden on the operator during the segmentation procedure.

The invention claimed is:

1. A computing system for interactively segmenting blood vessels in angiographic image data, wherein the segmentation apparatus comprising:

a processor; and a computer readable storage medium with computer readable executable instructions, including a significant location determiner, wherein the processor is configured to execute the significant location determiner instructions, which causes the significant location determiner to determine for one or more locations of a current segmentation of the blood vessels in the angiographic image data as significant locations at which the current segmentation has a predetermined influence on a value of a blood flow parameter that is calculated based on the current segmentation, and a display for displaying the significant locations to an operator.

2. The computing system of claim 1, wherein the significant location determiner comprises:

a significant location candidate determiner, which when executed by the processor causes the significant location determiner to determine one or more locations of the current segmentation as significant location candidates based on a criterion that depends on the current segmentation at the one or more locations; and a blood flow parameter calculator, which when executed by the processor causes the blood flow parameter to calculate, for a simulated variation of the diameter of the current segmentation at one of the significant location candidates, the value of the blood flow parameter at one or more of the significant location candidates, wherein the significant location determiner is adapted to determine the one of the significant location candidates as a significant location if the simulated variation of the diameter of the current segmentation results in a predetermined variation in the value of the blood flow parameter at one or more of the significant location candidates.

3. The computing system of claim 2, wherein the criterion is based on a rate of change of the diameter of the current segmentation at the one or more locations.

4. The computing system of claim 2, wherein the criterion is based on the value of the blood flow parameter calculated at the one or more locations.

5. The computing system of claim 2, wherein the significant location determiner is adapted to determine the one of the significant location candidates as a significant location if the value of the blood flow parameter at one or more of the significant location candidates transitions across a predetermined threshold as a result of the simulated variation of the diameter of the current segmentation.

6. The computing system of claim 2, wherein the significant location determiner is adapted to determine, for a structure of the blood vessels that is only incompletely segmented in the current segmentation, whether a simulated variation of the diameter of an estimated segmentation of the incompletely segmented structure results in the predetermined variation in the value of the blood flow parameter at one or more of the significant location candidates, wherein the display unit is adapted for displaying a result of the determination to the operator by means of a visual indication.

7. The computing system of claim 1, wherein the display is adapted to display the current segmentation with the angiographic image data to the operator, wherein the significant locations are indicated by means of visual indications.

8. The computing system of claim 1, wherein the significant location determiner comprises:
a blood flow parameter calculator, which when executed by the processor causes the blood flow parameter calculator to calculate the value of the blood flow parameter at the significant locations,
wherein the display is adapted for displaying the value of the blood flow parameter at the significant locations to the operator.

9. The computing system of claim 8, wherein the blood flow parameter calculator is adapted to calculate a certainty of the value of the blood flow parameter at the significant locations,
wherein the display is adapted for displaying the certainty of the value of the blood flow parameter at the significant locations to the operator.

10. The computing system of claim 1, wherein the blood flow parameter calculator is adapted to calculate the certainty of the value of the blood flow parameter at the significant locations by simulating a variation of the diameter of the current segmentation at the significant locations according to an expected segmentation error.

11. The computing system of claim 1, wherein the computer readable storage medium further comprises:
a segmentation modifier, which when executed by the processor cases the segmentation modifier to allow the operator to modify the current segmentation at least at the significant locations.

12. The computing system of claim 1, wherein the blood vessels include coronary arteries and the blood flow parameter is a virtual fractional flow reserve (vFFR).

13. The computing system of claim 1, wherein the computer readable storage medium further
a blood flow parameter calculator for calculating the values of the blood flow parameter.

14. A segmentation method for interactively segmenting blood vessels in angiographic image data, wherein the segmentation method comprises:
determining, with a processor, one or more locations of a current segmentation of the blood vessels in the angiographic image data as significant locations at which the current segmentation has a predetermined influence on a value of a blood flow parameter that is calculated based on the current segmentation, by means of a significant location determining unit, and
displaying the significant locations to an operator, by means of a display.

15. A non-transitory computer readable storage medium for storing a segmentation computer program for interactively segmenting blood vessels in angiographic image data, wherein the segmentation computer program comprises program code means for causing the segmentation apparatus, to carry out the steps of the segmentation method as defined in claim 14, when the segmentation computer program is run on a computer controlling the segmentation apparatus.

16. The method of claim 14 further comprising:
determining one or more locations of the current segmentation as significant location candidates based on a criterion that depends on the current segmentation at the one or more locations; and
calculating for a simulated variation of the diameter of the current segmentation at one of the significant location candidates, the value of the blood flow parameter at one or more of the significant location candidates,
wherein a significant location of the significant location candidates is determined as a significant location if the simulated variation of the diameter of the current segmentation results in a predetermined variation in the value of the blood flow parameter at one or more of the significant location candidates.

17. The method of claim 16 further comprising:
determining one of the significant location candidates as a significant location if the value of the blood flow parameter at one or more of the significant location candidates transitions across a predetermined threshold as a result of the simulated variation of the diameter of the current segmentation.

18. The method of claim 14, wherein the blood vessels include coronary arteries and the blood flow parameter is a virtual fractional flow reserve.

19. The method of claim 14, wherein the criterion is based on a rate of change of the diameter of the current segmentation at the one or more locations.

20. The method of claim 16 further comprising:
calculating the value of the blood flow parameter at the significant locations.

* * * * *